(12) United States Patent
Hu et al.

(10) Patent No.: US 8,633,292 B2
(45) Date of Patent: Jan. 21, 2014

(54) POLYURETHANE-BASED PHOTOCHROMIC OPTICAL MATERIALS

(75) Inventors: Geoffrey Yuxin Hu, San Diego, CA (US); Thomas J. Engardio, Vista, CA (US)

(73) Assignee: Signet Armorlite, El Paso, TX (US)

( * ) Notice: Subject to any disclaimer, the term of this patent is extended or adjusted under 35 U.S.C. 154(b) by 0 days.

(21) Appl. No.: 12/383,737

(22) Filed: Mar. 26, 2009

(65) Prior Publication Data

US 2010/0249264 A1  Sep. 30, 2010

(51) Int. Cl.
*C08G 77/04* (2006.01)
*G02C 5/00* (2006.01)
*A61F 2/14* (2006.01)

(52) U.S. Cl.
USPC ............ 528/28; 528/48; 524/89; 524/90; 524/94; 524/589; 524/590; 524/591; 623/4.1; 623/5.11; 359/238; 359/241; 351/41

(58) Field of Classification Search
USPC .......... 524/589, 590, 591, 89, 90, 94; 528/28, 528/48; 252/182.2, 182.21, 182.22, 589, 252/582; 351/41, 163; 359/23, 238, 241; 623/5.11, 4.1
See application file for complete search history.

(56) References Cited

U.S. PATENT DOCUMENTS

| | | | |
|---|---|---|---|
| 4,202,807 A | 5/1980 | Moretto et al. | |
| 4,286,957 A | 9/1981 | Le Naour Sene | |
| 4,489,176 A | 12/1984 | Kluth et al. | |
| 4,647,643 A | 3/1987 | Zdrahala et al. | |
| 4,650,845 A | 3/1987 | Hegel | |
| 5,110,881 A | 5/1992 | McBain et al. | |
| 5,322,945 A | 6/1994 | Krongauz et al. | |
| 5,512,609 A | 4/1996 | Yang | |
| 5,623,029 A | 4/1997 | Yang | |
| 5,714,304 A | 2/1998 | Gibbons et al. | |
| 5,880,171 A * | 3/1999 | Lim et al. ...................... | 523/106 |
| 5,905,148 A | 5/1999 | Krongauz et al. | |
| 5,942,158 A | 8/1999 | Okoroafor et al. | |
| 6,008,296 A | 12/1999 | Yang et al. | |
| 6,083,427 A | 7/2000 | Henry | |
| 6,087,064 A | 7/2000 | Lin et al. | |
| 6,153,691 A | 11/2000 | Gornowicz et al. | |
| 6,166,129 A * | 12/2000 | Rosthauser et al. .......... | 524/590 |
| 6,224,945 B1 | 5/2001 | Calderara | |
| 6,225,434 B1 | 5/2001 | Sadvary et al. | |
| 6,367,930 B1 * | 4/2002 | Santelices et al. ............. | 351/177 |
| 6,531,076 B2 | 3/2003 | Crano et al. | |
| 6,602,603 B2 | 8/2003 | Welch et al. | |
| 6,602,964 B2 | 8/2003 | Huang et al. | |
| 6,639,039 B1 | 10/2003 | Fries et al. | |
| 6,716,919 B2 | 4/2004 | Lichtenhan et al. | |
| 6,733,887 B2 | 5/2004 | Okoroafor et al. | |
| 6,759,487 B2 | 7/2004 | Gornowicz et al. | |
| 6,770,707 B2 | 8/2004 | Henry et al. | |
| 6,777,494 B1 | 8/2004 | Yang et al. | |
| 6,794,474 B2 | 9/2004 | Richard et al. | |
| 6,802,993 B2 | 10/2004 | Momoda et al. | |
| 6,853,471 B2 | 2/2005 | Sommer et al. | |
| 6,858,680 B2 | 2/2005 | Gunatillake et al. | |
| 6,939,939 B2 | 9/2005 | Slagel et al. | |
| 6,986,946 B2 | 1/2006 | Nishizawa et al. | |
| 6,998,072 B2 | 2/2006 | Welch et al. | |
| 7,198,639 B2 | 4/2007 | Lai et al. | |
| 7,247,262 B2 | 7/2007 | Evans et al. | |
| 7,261,842 B2 * | 8/2007 | Henry et al. .................. | 252/586 |
| 7,261,843 B2 | 8/2007 | Knox et al. | |
| 7,261,844 B2 | 8/2007 | Tanikawa et al. | |
| 7,265,178 B2 | 9/2007 | Maier et al. | |
| 7,368,174 B2 | 5/2008 | Fonda | |
| 2002/0086168 A1 | 7/2002 | Sadvary et al. | |
| 2002/0122946 A1 | 9/2002 | Kuck et al. | |
| 2003/0141490 A1 | 7/2003 | Walters et al. | |
| 2003/0165686 A1 | 9/2003 | Blackburn et al. | |
| 2003/0198819 A1 | 10/2003 | Reusmann et al. | |
| 2004/0012002 A1 | 1/2004 | Vassal et al. | |
| 2004/0054047 A1 * | 3/2004 | Lai et al. ........................ | 524/268 |
| 2004/0096666 A1 | 5/2004 | Knox et al. | |
| 2004/0116641 A1 | 6/2004 | Mather et al. | |
| 2005/0038205 A1 | 2/2005 | Wenning et al. | |
| 2005/0196626 A1 | 9/2005 | Knox et al. | |
| 2005/0245719 A1 * | 11/2005 | Mather et al. .................. | 528/60 |
| 2005/0254003 A1 | 11/2005 | Jani et al. | |
| 2006/0071203 A1 | 4/2006 | Mori et al. | |
| 2006/0093844 A1 * | 5/2006 | Conklin et al. ............... | 428/500 |
| 2006/0194068 A1 | 8/2006 | Katoh et al. | |
| 2006/0194919 A1 | 8/2006 | Lichtenhan et al. | |
| 2007/0001155 A1 | 1/2007 | Walters et al. | |
| 2007/0059538 A1 | 3/2007 | Inokuchi | |
| 2007/0112129 A1 | 5/2007 | Licht et al. | |
| 2007/0159594 A9 | 7/2007 | Jani et al. | |
| 2007/0187656 A1 | 8/2007 | Evans et al. | |
| 2007/0190344 A1 | 8/2007 | Inagaki et al. | |
| 2007/0257238 A1 | 11/2007 | Misura et al. | |
| 2007/0260008 A1 | 11/2007 | Saito et al. | |
| 2008/0006798 A1 | 1/2008 | Evans et al. | |
| 2008/0032218 A1 | 2/2008 | Wu et al. | |
| 2008/0055540 A1 | 3/2008 | Mosse et al. | |
| 2008/0067701 A1 * | 3/2008 | Ford et al. ....................... | 264/1.1 |
| 2008/0108773 A1 | 5/2008 | Wicks et al. | |
| 2008/0233164 A1 * | 9/2008 | Seifalian et al. .............. | 424/423 |

FOREIGN PATENT DOCUMENTS

WO  WO 2006/050938  5/2006

* cited by examiner

Primary Examiner — Michael L Leonard
(74) Attorney, Agent, or Firm — Ice Miller LLP

(57) ABSTRACT

A photochromic composition for making optical materials comprising a polyurethane prepolymer formed by combining an isocyanate and a compound having an active hydrogen containing group, a polysilsequioxane and a photochromic compound. The photochromic composition may also include a monomer that has both an active hydrogen containing group and an unsaturated group. The polysilsesquioxane is incorporated as a copolymer and/or as a polysilsequioxane-chemically modified polyurethane.

45 Claims, No Drawings

POLYURETHANE-BASED PHOTOCHROMIC OPTICAL MATERIALS

BACKGROUND OF THE INVENTION

The present invention relates to compositions for and methods of making polyurethane-based photochromic optical materials and, in particular, to polyurethane-based photochromic optical materials containing polysilsesquioxanes.

Photochromic plastic materials for optical applications have been the subject of considerable attention because of the advantages plastics provide in comparison to glass, including lower density and superior mechanical properties, such as impact strength. Applications for photochromic plastic materials include numerous transparent articles, such as ophthalmic lenses, vehicle or airplane windshields, etc.

Methods of rendering plastic materials photochromic include coating the plastic object with a coating containing a photochromic dye(s), laminating a plastic material containing photochromic dye(s) to the object, casting a photochromic layer onto the object, and incorporation of photochromic dyes directly into the plastic used to form the object. In the case of direct incorporation of the photochromic dye into the plastic that makes up the object, the plastic needs to provide a suitable environment for the photochromic dyes to transform from their light (or faded) state to their darkened state and back with good efficiency. At the same time, the object needs to have certain mechanical properties depending on the object's application.

In the case of ophthalmic lenses used for spectacles, mechanical durability and hardness are required for the various lens-processing steps such as grinding, polishing, edging, and mounting the lens into a variety of frames, such as drill-mount frames. Additionally, for the completed lens, a certain amount of impact strength is required. Generally, the material conditions needed for good photochromic performance (for example, soft and flexible polymers) are different than those required for mechanical processing (for example, hard and rigid polymers). Therefore, compromises are usually made to the material's properties to achieve photochromic performance. One property that can be particularly affected is material brittleness, as one attempts to make a more processable lens. Often chipping and cracking of the lens is encountered during lens deblocking after grinding and polishing, edging, or mounting in frames, particularly of the drill-mount type. Thus it would be desirable to provide a photochromic material that has the physical properties of low brittleness, good impact strength and good photochromic performance typical of a soft, flexible polymer, in combination with the mechanical processability and hardness characteristic of a hard, rigid polymer.

SUMMARY OF THE INVENTION

Polyurethane-based photochromic compositions are disclosed, comprising a polyurethane prepolymer that is the reaction product of an isocyanate and a compound having an active hydrogen containing group, a polysilsesquioxane and a photochromic compound. In one embodiment, a photochromic ophthalmic spectacle lens comprises the polymerization product of such photochromic compositions. In yet another embodiment, the photochromic composition further comprises a monomer that has both an active hydrogen containing group and an unsaturated group.

Methods of making a photochromic article are also disclosed, comprising the steps of providing an isocyanate, a compound having an active hydrogen containing group, a monomer that has both an active hydrogen containing group and an unsaturated group, a polysilsesquioxane and a photochromic compound. The photochromic compound is combined with the isocyanate, or the compound having an active hydrogen containing group, or the monomer that has both an active hydrogen containing group and an unsaturated group. The isocyanate and the compound having an active hydrogen containing group are combined to form a polyurethane prepolymer. The monomer is combined with the polyurethane prepolymer to form a urethane resin. The polysilsequioxane is combined with the urethane resin and the mixture is polymerized to form the photochromic article. In an alternative embodiment, the photochromic compound is combined with a photochromic promoter. The photochromic compound, photochromic promoter and polysilsequioxane are combined with the urethane resin, and the mixture polymerized to form the article.

DETAILED DESCRIPTION OF THE INVENTION

Polyurethane-based photochromic compositions for optical materials, such as ophthalmic spectacle lenses, are described that combine polyurethane prepolymers and nano materials. Monomers that have both active hydrogen groups and unsaturated functionality may also be incorporated into the photochromic composition. Optical materials formed from the polymerization products of such photochromic compositions have been found to combine excellent photochromic dye response, good hardness for lens processing, low brittleness and high impact strength. An additional feature of these photochromic compositions allows for curing by means of either thermal polymerization or photopolymerization methodologies.

The polyurethane prepolymers are prepared by the reaction of an isocyanate with another compound containing an active hydrogen in an attached group. Such groups containing an active hydrogen include hydroxyl, thiol, amine or acid groups. The prepolymer can be cured by ultraviolet light (UV) or thermally cured, either by free radical polymerization if the prepolymer contains unsaturated groups, such as (meth)acrylate, vinyl, or allyl groups, or by cationic polymerization, if it contains epoxy or episulfide groups.

The isocyanate compounds can be defined as:

$$R_1(NCY)_x$$

where x is greater than or equal to two; Y can be O or S; and $R_1$ can be any of alkylene, arylene, hydrocarbon or substituted hydrocarbon containing one or more aryl-NCY and/or one or more alkyl-NCY bonds. In an alternative embodiment, $R_1$ can be —R—Z—R, where Z can be any divalent moiety such as O, CO, $CO_2$, S, SRS, ORO, $SO_2$, CONH, etc.

One or more isocyanate compounds containing one or more isocyanate groups can be used. In a preferred embodiment, the isocynate compounds are aromatic, aliphatic or cycloaliphatic isocyanates or polyisocyanates. The isocyanates or polyisocyanates may also have one or more halogen substitutions in their structure. Examples of suitable isocyanates include m (or p)-xylene diisocyanates (such as TMXDI), isophorone diisocyanate (IPDI), trimethylhexamethylene diisocyanate (TMDI), dicyclohexylmethylene diisocyanate (H12MDI), hexamethylene diisocyanate (HDI), cyclohexane diisocyanate (CHDI), bis(isocyanatomethyl)cyclohexane (DDI), toluene diisocyanate (TDI), methylene diphenyldiisocyanate (MDI), polymeric methylene diphenyl diisocyanate (PMDI), phenylene diisocyanate (PDI), naphthalene diisocyanate (NDI), and the like, also including their chemical derivatives.

Compounds having an active hydrogen containing group are incorporated into the disclosed plastic optical materials by the reaction with the isocyanates and/or polyisocyanates. The active hydrogen group can be —OH, —NH2, —NH—, —SH, —COOH and the like. The active hydrogen containing compound can be defined as:

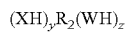

$(XH)_y R_2 (WH)_z$ where y+z is greater than or equal to two; X and W can be O, S, NH, $NR_3$ (where $R_3$ can be any kind of alkylene, arylene, hydrocarbon or substituted hydrocarbon groups) or COO; X and W can be the same or different groups; and $R_2$ can be any kind of alkylene, arylene, polyester, polyether, hydrocarbon or substituted hydrocarbon groups having 2 to 200 carbon atoms. One, or a mixture of more than one, compound containing the active hydrogen groups can be used.

In the case where X and W are oxygen, the compounds are polyols, such as di-; tri-; or tetra-functional polycaprolactones, polyethylene glycol, polypropylene glycol, ethoxylated or propoxylated trimethylolpropane, hexanediol, butanediol and the like. When W and X are sulfur, the compounds are polythiols, such as di-; tri-, or tetra-mercaptopropionates, ethanedithiol, cyclohexanedithiol and the like. When W and X are NH or $NR_3$, the compounds are polyamines, such as diethyltoluenediamine. When the X and W are different species, the compound could be, for example, a hydroxylamine, such as hydroxyethylamine, or a hydroxythiol, such as 2-mercaptoethanol.

When the photochromic composition is used for the production of ophthalmic lenses, the polymerized composition can range in thickness from about 1 mm to about 20 mm. In this case, it is preferred that the polyurethane prepolymer has a branched structure to provide the mechanical properties needed to allow the lens to be machined, ground, polished and edged to the final prescription requirement and frame shape. The branched structure can be achieved by incorporating an isocyanate as previously described:

$R_1(NCY)_x$ where x>2, as a fraction of the isocyanate(s) used for the reaction. Alternatively, the branched structure can be achieved by incorporating an active hydrogen containing compound with active hydrogen groups as described previously:

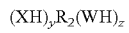

$(XH)_y R_2 (WH)_z$ where y+z>2, as a fraction of the active hydrogen-containing compounds used for the reaction. Combinations of such isocyanates and active hydrogen containing compounds may also be used.

For preparing free radical photo or thermal curable photochromic compositions, it is presently preferred that the ratio of the active hydrogen groups in the active hydrogen containing compounds to the isocyanate groups in the isocyanate compounds is in a range of from about 0 to about 0.60, and more preferably in the range of about 0.02 to about 0.40 in order to have the remaining isocyanate groups react with compounds having both active hydrogen group(s) and unsaturated functionality.

The photochromic composition preferably also incorporates one or more monomers having both active hydrogen groups and unsaturated functionality. The monomers include monomer oligomers, and can be defined by:

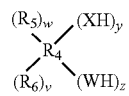

where X and W have the same definition as previously described; y+z is equal to one or more; $R_5$ and $R_6$ are the same or different unsaturated groups, such as (meth)acrylate, vinyl, or allyl groups; w+v is equal to or greater than one; and $R_4$ is any type of alkylene, arylene, polyester, polyether, hydrocarbon or substituted hydrocarbon groups having from 2 to 200 carbon atoms. One or more of the monomers having both active hydrogen groups and unsaturated functionality can be used. Examples of suitable monomers having both active hydrogen groups and unsaturated functionality include hydroxyalkyl(meth)acrylates, such as hydroxyethyl(meth) acrylate, hydroxybutyl(meth)acrylate, pentaerythritol tri (meth)acrylate, and the like. The term (meth)acrylate means that either acrylate or methacrylate groups can be utilized.

In a preferred embodiment, the mole ratio of the active hydrogen groups in the compound(s) that have both active hydrogen groups and unsaturated functionality, to the isocyanate groups in the isocyanate compounds is in a range of from about 0.5 to about 1.10, and more preferably in the range of about 0.7 to about 0.9.

The nano materials incorporated in the polyurethane-based photochromic compositions comprise polysilsesquioxanes. Nano materials are widely used in coatings, plastics and rubbers for enhancing the mechanical performance of those materials. However, nano materials are prone to form aggregates that can cause haziness and reduce the clarity of optical materials. Consequently, although nano materials have been used in very thin coatings (e.g., about 1-10 microns thick), they have generally not been suitable for use in making bulk optical materials, such as ophthalmic lenses.

In contrast to the use of conventional nano materials, it has been found that polysilsesquioxanes are highly compatible with photochromic polyurethane resin-based lenses and are capable of producing optically clear ophthalmic lens materials. Suitable polysilsesquioxanes include polyhedral oligomeric silsesquioxanes having the general formula $[(RSiO_{1.5})_n]\Sigma n(Tn)$ where n is an even number and R is all the same or different organic or inorganic groups, and their analogs and derivatives. Alternatively, the polysilsequioxanes can be polyhedral oligomeric silicates having the general formula $[R_{n+2}Si_{n-1}O_{1.5n-3}]\Sigma n(T_{n-1})$ where n is an even number and R is all the same or different organic or inorganic groups, and their analogs and derivatives. A mixture of different polysilsesquioxanes may also be used.

Examples of suitable polyhedral oligomeric silsesquioxanes are shown below, having structures (A) and (B):

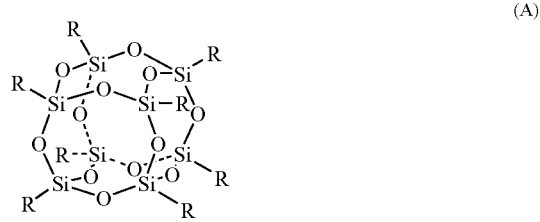

-continued

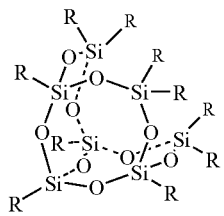

(B)

The R groups can be any organic or inorganic groups, that preferably contains from one to 20 carbon atoms. The R groups can all be the same group—for example, methacryl propyl (as is the case for MA0735 Methacryl POSS®, available from Hybrid Plastics, Inc. (Hattiesburg, Mass.). Alternatively, the R groups can also be different groups within the same molecule. For example, one of the R groups can be a mercaptopropyl group, and the remaining R groups can all be isooctyl groups.

In a preferred embodiment, the R groups of the polysilsesquioxane compound have unsaturated functionalities, such as the methacryl (MA0735), methacrylphenyl (MA0734), methacrylisooctyl (MA0719), methacrylisobutyl (MA0702), acrylo (MA0736), acryloisobutyl (MA0701), allylisobutyl (OL1118), monovinylisobutyl (OL1123), octavinyl (OL1160), octavinyldimethylsilyl (OL1163) derivatives of polyhedral oligomeric silsesquioxane (all POSS® compounds, available from Hybrid Plastics, Inc.—Hattiesburg, Mass.). Such polysilsesquioxane compounds may simply be blended with the photochromic composition to form a copolymerizable composition.

In an alternative embodiment, the polysilsesquioxane compound is incorporated into the polyurethane composition by means of reaction to obtain a polysilsesquioxane-chemically modified polyurethane. For example, at least one of the R groups on the polyhedral oligomeric silsesquioxane structure (A) may be an active hydrogen containing group that is capable of reacting with an isocyanate. The polysilsesquioxane compound may be pre-dispersed into the other compounds having an active hydrogen containing group described above, such as polyols, or the monomer compounds having both active hydrogen groups and unsaturated functionality, such as hydroxyethyl methacrylate, prior to reaction with isocyanate.

The concentration of polysilsesquioxane nano materials is preferably in a range of from about 0.1 wt % to 40 wt % of the photchromic composition, and more preferably from about 0.5 wt % to about 25 wt %. The polysilsesquioxane compound(s) can be incorporated into the photochromic composition either by addition of the polysilsesquioxane compound during preparation of the polyurethane prepolymer, or by simply blending the polysilsesquioxane compound with the prepolymer.

The photochromic compounds preferably have at least one activated absorption maxima within the range between about 400 nm and 750 nm, and are thermally and chemically stable. Suitable photochromic compounds include organic photochromic dyes that can be used either alone or in combination with one or more other photochromic compounds. Organic photochromic dye compounds can include spiropyrans, spirooxazines, naphthopyrans, benzopyrans, fulgides, indenonphthopyrans, and the like.

Because the polyurethane prepolymers are high viscosity materials before curing, it can be difficult to dissolve or disperse the photochromic compounds into the polyurethane prepolymers. However, if the photochromic compounds are pre-dissolved into one or more of the reactants used to form the polyurethane prepolymer, the cured optical material will exhibit similar mechanical performance as material made without photochromic components. This technique can be used to effectively incorporate photochromic dyes into the polymer.

Alternatively, the photochromic dyes can be dissolved in a low-boiling carrier solvent that is blended with the urethane composition. The solvent can subsequently be removed by heating and/or vacuum. More preferably, the carrier solvent is a reactive monomer having high photochromic dye solubility, and as such can be directly incorporated into the resulting polymer during curing. In this case, no solvent removal step is required. Preferably the monomer is selected for high photochromic dye solubility such that no more than about 20 wt % of monomer is required, since the properties of the final polymer may be adversely affected by higher concentrations of monomer. More preferably, the monomer concentration is less than about 10 wt %.

In yet another embodiment, the photochromic compounds are dispersed into the high viscosity polyurethane system by dissolving the photochromic compounds into a photochromic promoter, then mixing the photochromic dye-containing promoter solution into the polyurethane system to form the photochromic composition. Photochromic promoters are compounds that exhibit excellent compatibility and solvency for the photochromic compounds. They additionally improve the speed of transformation of the compound from the faded to the darkened state and back, and/or increase the photochromic dynamic range, that is, the difference in light transmission between the faded and darkened states. In one embodiment, the photochromic promoter is capable of chemically bonding, to at least some extent, with the polymer structure and does not adversely affect the mechanical or optical properties of the final polymer (such as clarity and freedom from distortion). Such promoters include tertiary amines, amides and sulfones. Examples of such compounds include bis-(2-dimethylaminoethyl)ether; 2,2'-dimorpholinodiethylether; 4-[2-(dimethylamino)ethyl]morpholine, vinyl pyrrolidone, and vinyl sulfone.

The concentration of the photochromic compounds in the photochromic composition preferably ranges from about 0.001 wt % to about 7.0 wt %. In particular, where the photochromic composition is used to make in-mass or thick section plastic articles, such as ophthalmic spectacle lenses, the concentration of the photochromic compounds in the photochromic composition preferably ranges from about 0.01 wt % to about 0.5 wt %. The photochromic compounds can be blended into the polyurethane prepolymer by either incorporating them into a low boiling solvent as previously described, or by first mixing the photochromic compounds with a monomer having sufficient solvent properties to dissolve or disperse the photochromic compound(s), and then blending the mixture into the polyurethane prepolymer. Alternatively, the photochromic compounds can be incorporated into the polyurethane prepolymer resin by pre-dissolving or dispersing them into one or more of the reactants used to prepare the photochromic composition.

The photochromic compounds also can be incorporated into the polyurethane prepolymer by dissolving the compounds into a photochromic promoter. Suitable photochromic promoters include tertiary amines, amides and sulfones or their derivatives and analogs. The preferred tertiary amine is 4-[2-(dimethylamino)ethyl]morpholine. The concentration of the photochromic promoters is preferably in a range of from about 0.01 wt % to about 5 wt %, and preferably from about 0.1 wt % to about 2 wt % of the photochromic composition.

The photochromic composition may contain additives, such as polymerization initiators. The initiators may be photoinitiators or thermal initiators as are known in the art. Photoinitiators may be phosphorus or non-phosphorous containing photoinitiator compounds, either alone or in combination. Examples of suitable phosphorous-containing photoinitiators suitable for use in curing the prepolymer resin compositions include phosphine oxide photoinitiators and phosphinate photoinitiators. Preferred phosphine oxide and phosphinate photoinitiators include dimethoxybenzoyl phenylphosphinate, dimethylbenzoyldiphenylphosphine oxide, trimethylbenzoyl diphenylphosphine oxide, and bis-dimethoxybenzoyl trimethylpentyl phosphine oxide. Suitable non-phosphorus containing photoinitiators include xanthones, camphorquinone, phenanthrenequinone, diketone compounds or monoketal derivatives thereof, acyloins or acyloinethers.

Thermal initiators may be peroxide and/or nitrile-based. Examples of suitable peroxide-based initiators include: di-(4-tert-butylcyclohexyl)peroxydicarbonate, tert-butyl peroxy-2-ethyl-hexanoate, tert-butyl peroxyneodecanoate, benzoyl peroxide, and the like. Suitable nitrile-based initiators include 2,2'-azobis(isobutyronitrile), 2,2'-azobis(2-methylbutyonitrile), and the like. Selection of the proper thermal initiator is, in part, determined by the potential for reactivity with the photochromic compounds. For example, photochromic dyes will be less adversely affected by the nitrile initiators, and therefore nitrile initiators are generally preferred for resin compositions containing photochromic dye compounds.

The photochromic composition may also include other additives such as non-photochromic dyes and pigments, antioxidants, inhibitors (such as butylated hydroxyanisole (for example, BHA), butylated hydroxytoluene (for example, BHT), hydroquinones, and the like), and photostabilizers, including UV absorbers and hindered amine light stabilizers. In a preferred embodiment, the additives are present in the range of from about 0.001 wt % to about 2.0 wt % of the photochromic composition. The additives are incorporated into the photochromic composition either by adding them directly into the polyurethane prepolymer or, more preferably, using the same methods described for adding the photochromic compounds—e.g., by dissolving the additives in a solvent or monomer and then adding the mixture to the polyurethane prepolymer, by combining them with one or more of the reactants prior to preparing the polyurethane prepolymer, or by dissolving them in a photochromic promoter prior to adding them to the photochromic composition.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Example 1

Materials

CAPA2125A is a polycaprolactone-based diol (molecular weight average=1250), available from Perstorp UK Ltd. (Cheshire, England). CAPA3031 is a polycaprolactone-based triol (molecular weight average=540) available from Perstorp UK Ltd. DBTDL is dibutyltin dilaurate, a catalyst available from Sigma-Aldrich Corp. (Milwaukee, Wis.). TMDI is trimethyl-hexamethylene diisocyanate, commercially available as Vastanat TMDI (Evonik Degussa Corp.). TMXDI is tetramethylxylene diisocyanate available from Cytec Industries, Inc. (West Paterson, N.J.). HEMA is hydroxyethyl methacrylate, commercially available as BM905 (Evonik Degussa Corp.). BHT is 2,6-di-tert-butyl-4-methylphenol available from Sigma-Aldrich Corp. Tinuvin 292 is a hindered amine light stabilizer available from Ciba Specialty Chemicals (Basel, Switzerland). Irgacure 2100 is a photoinitiator available from Ciba Specialty Chemicals. CNN9 is a photochromic dye available from Tokuyama America, Inc. (Arlington Heights, Ill.). Reversacol® Amber is a photochromic dye available from James Robinson Ltd. (Huddersfield, England). SR368 is tris(2-hydroxy ethyl) isocyanurate triacrylate available from Sartomer Company, Inc. (Exton, Pa.). MA0735 is methacryl polyhedral oligomeric silsesquioxane (POSS) available from Hybrid Plastics, Inc. (Hattiesburg, Miss.). DMAEM is 4-[2-(dimethylamino)ethyl]morpholine, a photochromic compatibilizer/promoter available from Sigma-Aldrich Corp.

Example 2

Preparation of Polyurethane Compositions

Sample polyurethane compositions were prepared with or without the addition of polyhedral oligomeric silsesquioxanes. A urethane resin was first prepared as a mixture of Components A, B and C as set forth in alternative Formulas I and II (Tables 1, 2), comprising compounds having an active hydrogen containing group (Component A), isocyanates and catalyst (Component B) and monomer with an active hydrogen-containing group and unsaturated functionality (Component C). Component D, comprising a mixture of photochromic compounds and additives, was prepared as set forth in alternative Formulas III and IV (Tables 3, 4) and incorporated into the urethane resin.

TABLE 1

Urethane Resin (Formula I)

| Component A: | CAPA2125A | 44.40 wt % |
|---|---|---|
| Component B: | DBTDL | 50 ppm |
|  | TMDI | 26.57 wt % |
|  | TMXDI | 2.50 wt % |
| Component C: | BHT | 0.03 wt % |
|  | HEMA | 26.50 wt % |

TABLE 2

Urethane Resin (Formula II)

| Component A: | CAPA2125A | 16.44 wt % |
|---|---|---|
|  | CAPA3031 | 7.14 wt % |
| Component B: | DBTDL | 50 ppm |
|  | TMDI | 36.53 wt % |
|  | TMXDI | 3.44 wt % |
| Component C: | BHT | 0.30 wt % |
|  | HEMA | 36.42 wt % |

TABLE 3

| Component D (Formula III) | |
|---|---|
| Tinuvin 292 | 72.41 wt % |
| Irgacure 2100 | 10.78 wt % |
| BHT | 11.21 wt % |
| CNN9 | 2.16 wt % |
| Reversacol ® Amber | 3.45 wt % |

TABLE 4

| Component D (Formula IV) | |
|---|---|
| Tinuvin 292 | 42.00 wt % |
| Irgacure 2100 | 6.25 wt % |
| BHT | 6.50 wt % |
| CNN9 | 1.25 wt % |
| Reversacol ® Amber | 2.00 wt % |
| DMAEM | 42.00 wt % |

Component A was prepared by combining the specified polyol compound(s) having an active hydrogen containing group at the weight percentages specified and thoroughly mixing at 50° C.

Component B was prepared by combining the specified isocyanate(s) with dibutyltin dilaurate (DBTDL) in an empty reactor.

Component C was prepared by dissolving butylated hydroxy toluene (BHT) in hydroxyethyl methacrylate (HEMA) at the specified weight percentages.

Component D was prepared by combining the specified photochromic compounds and additives at the weight percentages specified and stirring until completely mixed. The additives included initiators, stabilizers and inhibitors. In the case of Component D (Formula IV), the photochromic compounds were also combined with DMAEM, a photochromic compatibilizer/promoter. Warming the mixture was found to be helpful to assist with dissolution, particularly of the photochromic dyes.

The sample polyurethane compositions were prepared as set forth in Table 5. Sample I was prepared using Components A, B and C as specified in Formula I (Table 1) and Component D as specified in Formula III (Table 3). Polyurethane compositions Samples 2-6 were prepared using Components A, B and C as specified in Formula II (Table 2) and Component D as specified in Formula III (Table 3). Sample 7 was prepared using components A, B, and C as specified in Formula II (Table 2), Component D as specified in Formula IV (Table 4).

In a first reaction step, the polyurethane prepolymer was prepared by gradually introducing Component A into the reactor containing the isocyanate mixture (Component B) while stirring. The temperature was maintained between 75° C. and 85° C. After all of Component A had been dispensed into the reactor, mixing continued for 1 hour while maintaining the temperature between 75° C. and 85° C.

In a second reaction step, a urethane resin was formed by gradually introducing Component C into the reactor while mixing. After the addition of Component C was complete, the contents of the reactor were stirred until essentially all of the isocyanate was consumed as determined by FTIR (Fourier Transform Infrared) spectroscopy (monitoring the absorption peak at about 2200 cm$^{-1}$). The system temperature was maintained between 80° C. and 90° C. throughout, to ensure completion of the reaction.

Following completion of the reaction, Component D and other components (MA0735, SR368) were added to the reactor in the stated weight percentages. Preheating the urethane resin mixture to about 70° C. before adding Component D and other components, was found to assist in obtaining a homogeneous mixture. In the case of Component D (Formula IV), the photochromic promoter, DMAEM, acts as an excellent solvent for the dyes, so the dyes were mixed first with the DMAEM and then with the other compounds for improved incorporation of the dyes into the final formulation.

TABLE 5

Polyurethane Compositions
Polyurethane Composition (wt %)

| Sample | Components A, B, C | Component D | MA0735 | SR368 |
|---|---|---|---|---|
| 1 | 98.85 (I) | 1.15 (III) | | |
| 2 | 98.85 (II) | 1.15 (III) | | |
| 3 | 79.08 (II) | 1.15 (III) | | 19.77 |
| 4 | 88.96 (II) | 1.15 (III) | | 9.89 |
| 5 | 88.96 (II) | 1.15 (III) | 9.89 | |
| 6 | 90.76 (II) | 1.17 (III) | 6.05 | 2.02 |
| 7 | 90.00 (II) | 2.00 (IV) | 6.00 | 2.00 |

Example 3

Lens Casting

Polyurethane composition Samples 1-7 were prepared as described in Example 2, and cast as an ophthalmic lenses. Each sample was vacuum degassed at about 5 torr pressure and a temperature of 75° C. to 85° C. for about 2 hours. The mixture was gently stirred to assure homogeneity.

The degassed polyurethane composition was heated to a temperature between 40° C. and 70° C., and then transferred into a lens mold assembly comprising a front glass mold with a concave casting surface (typically with a curve of about 6 diopters), a rear glass mold with a convex casting surface (typically with a curve of about 6 diopters), and a suitable gasket to separate the two casting surfaces by a distance of about 4 mm to about 16 mm. After the mold assembly was filled, the gasket hole was covered with a drop resin and was sealed by exposing the drop to a narrow beam of light from an LED assembly having emission in the range of 380 nm to 420 nm and a power output of about 0.50 watt for approximately 10 seconds.

The polyurethane composition in the mold assembly was then placed in a curing chamber containing two rows of Philips type TLK 40 W/03 Super Actinic fluorescent lamps placed at a distance of approximately 2.0 inches from each of the front and rear molds of the mold assembly. Light from the Super Actinic lamps entered the mold assembly from both the front and the rear of the assembly simultaneously. The mold assembly was exposed to the light for 40 minutes in order to polymerize the polyurethane composition. The peak emission of the lamps was centered at approximately 420 nm. Filters were employed to block any ultraviolet light (wavelengths less than about 390 nm) from reaching the mold assembly. The curing chamber temperature was approximately 75° C. After curing, the gasket was removed from the assembly and the front and rear glass molds were separated from the polymerized lens and the lens was allowed to cool to room temperature.

Example 4

Lens Processing and Testing

Cast lenses prepared as described in Example 3 were subsequently processed by machining and polishing the lenses to a uniform thickness of 2.0 mm (±0.1 mm) and then were measured for photochromic performance, yellow index, impact strength, and glass transition temperature as described below. Hardness measurements were made directly on the surfaces of the lenses. Refractive index and Abbe measurements were made using flat edge-polished rectangular samples processed from the lenses. The results of the tests are shown in Table 5 below.

The photochromic performance of the lenses was tested by measuring for: (1) Faded Transmission—the percentage visible light transmission of the lens in the unactivated state, (2) Darkened Transmission—the percentage visible light transmission of the lens when darkened by the simulated sunlight for about 15 minutes, and (3) Time To Fade—the number of minutes required for the darkened lens to fade through 80% of its dynamic range. The dynamic range is defined as the difference between the faded state transmission and darkened state transmission.

Light transmission through the lenses was measured using a HunterLab UltraScan XE (Hunter Assocs. Lab. Inc.—Reston, Va.). The testing device was outfitted with a quartz glass sample cell to hold the test lens in a temperature controlled water bath. The sample cell water temperature was maintained at 23° C. by a Haake F8 temperature control bath.

A xenon arc solar simulator was used as the activating uniform light source. A 1.6 KW Large Area Light Source, Oriel Model 92190-1000 and a 1600 W Arc Lamp Power Supply, Oriel Model 68922 (available from Newport Corp.—Stratford, Conn.) formed the basis of the activating light source. The output of the simulator was modified using air-mass correction filters capable of approximating sunlight at 50,000 lux (±3,000 lux) with a UVA content of 6.5 to 11 W/m$^2$ integrated from 315 to 380 nm as provided by ISO standard 8980-3. Typical UVA irradiance was about 8.7 to 9.0 W/m$^2$. This condition was set up by using an Air Mass 0 plus two Air Mass 1 filters in series in the xenon solar simulator. Light intensity was maintained during testing using an Oriel Light Intensity Controller Model 68851, and was set and checked using an Ocean Optics Inc. (Dunedin, Fla.) spectrophotometer, model USB2000. The spectrophotometer was calibrated using an Oriel Standard of Spectral Irradiance bulb (Model 63350), with a specified range of 250-2400 nm and a suitable radiometric power supply (Oriel. Model 69935).

The lenses were tested by exposing the sample cell to the simulated sunlight for approximately 30 seconds, positioning the sample cell in the UltraScan's measurement port within one second for the measurement, then positioned back into the simulated sunlight within one second after measurement. The cycle was repeated for a total exposure time of 15 minutes. Readings were then taken without exposure to the simulator at 30 second intervals for an additional 15 minutes, at a minimum. Since transmission readings were made with the samples in a water bath, corrections were made to determine equivalent air transmission values. The weighted average percent transmission per timed measurement for each lens was determined by using a photopic correction for the individual transmission data for each wavelength analyzed (as described in ISO Standard 8980-3). The transmission data was collected between 360 nm and 750 nm at 10 nm intervals. Prior to measurement, the lenses were conditioned under fluorescent room light for a minimum of 8 hours.

Hardness was measured using a Barber Colman type 935 machine, as is known in the art.

Refractive index and Abbe number were determined by using an Abbe refractometer (Milton Roy) as is known in the art. All sample lenses were found to have a measured index of refraction of about 1.50 and an Abbe Number of about 53.

Yellow index (ASTM D-1925) was measured by the Hunter UltraScan XE in regular transmission mode with the lens in the initial faded state.

Impact strength was measured by dropping steel bullets having a spherical impact surface with a radius of approximately a 7.95 mm from various heights, onto the convex surface of the 2.0 mm thick processed lens sample positioned on a fixture described in ANSI Z80.1, until the lens fractured. The mass of the bullet used and the height at which the fracture occurred were used to determine the energy equivalent of dropping a 16 gram steel ball of 15.9 mm diameter from the height indicated in Table 5 (in inches).

The glass transition temperature (Tg) was determined using a DMA Q800 Dynamic Mechanical Analyzer (available from TA Instruments—Newcastle, Del.) using a single cantilever clamp. The lens sample dimensions were 17.5 mm in length, 13.6 mm in width, and 2.0 mm thickness. The oscillation frequency was 1.0 Hz and the amplitude of oscillation was 30.0 microns. The lens sample heating rate was 2.0° C. per minute. The temperature corresponding to the peak tan δ was recorded as the Tg.

TABLE 6

Lens Test Results

| Sample | Hardness (Barcol) | Impact (in.) | Yellow Index | Faded Transm. (% T) | Darkened Transm. (% T) | Time To Fade 80% (min.) | Tg (° C.) |
|---|---|---|---|---|---|---|---|
| 1 | 43.5 | >1000 | 4.83 | 86.8 | 21.9 | 1.8 | 54 |
| 2 | 83.0 | 503 | 2.36 | 86.6 | 21.8 | 26.6 | 95 |
| 3 | 87.5 | 440 | 2.97 | 84.8 | 23.5 | 46.2 | 113 |
| 4 | 85.5 | 375 | 2.57 | 86.1 | 22.7 | 36.7 | 106 |
| 5 | 86.5 | 380 | 2.40 | 87.4 | 21.8 | 24.9 | 97 |
| 6 | 86.0 | 333 | 2.48 | 86.9 | 22.2 | 28.5 | 98 |
| 7 | 85.5 | 373 | 2.83 | 87.4 | 21.7 | 13.6 | 92 |

A cast lens having acceptable processing characteristics preferably has a Barcol hardness value greater than about 70, more preferably with a Barcol hardness greater than about 80, and still more preferably with a Barcol hardness greater than about 85. Additionally, because of subsequent lens processing steps such as cleaning and coating operations, the lens can be subjected to moderately high temperatures required for drying the lens or curing a lens coating. As such, it is desirable to have a lens material with a higher glass transition temperature (Tg), preferably greater than about 80° C.

Lenses having acceptable photochromic performance must transition quickly between the darkened to faded states, to minimize the time that a photochromic lens wearer moving from an outdoor to an indoor environment must wait for the lenses to return to an essentially clear state from the darkened state. A Time To Fade 80% of the dynamic range of the lens that is less than about 20 minutes is preferred, and more preferably less than about 15 minutes.

Polyurethane composition Sample 1 utilized a urethane resin made by the reaction of a moderately high molecular weight diol with a mixture of diisocyanates to produce a linear urethane methacrylate. The resulting cast lens was found to be quite soft (Barcol hardness of 43.5) and flexible, with high impact strength and very fast photochromic Time To Fade performance. As expected, the glass transition temperature of the lens was quite low (54° C.). The softness of this lens would make it generally unsuitable for use as an ophthalmic lens for spectacles. Its low hardness would make it difficult to achieve a good surface polish, and the extreme flexibility would make grinding and polishing to achieve prescription accuracy without optical distortion difficult under normal optical laboratory processing conditions.

Polyurethane composition Sample 2 overcomes the hardness problems found with lenses made of the linear urethane resin of Sample 1. In this example, the same polyol hydroxyl to isocyanate mole ratio was used as in Sample 1. However, in Sample 2, some of the difunctional diol was substituted with a trifunctional triol. The resulting branched structure urethane resin, when cast and cured into a lens, resulted in an acceptably hard lens (Barcol of 83.0). Additionally, the glass transition temperature reached 95° C., a more desirable level. While the impact strength of the lens was reduced, it was still ten times the FDA dropball requirement of 50 inches, reflecting a high level of strength. Although the photochromic performance of the lens would be considered commercially acceptable, it would be more desirable to have a shorter time to fade.

Polyurethane composition Samples 3 and 4 increase the crosslink density by incorporating a trifunctional acrylic crosslinking monomer (SR368), to improve the hardness and glass transition temperature of the lens without dramatically affecting impact strength. Sample 3 incorporates about 19.8 wt % SR368, and Sample 4 incorporates about 9.9 wt % SR368. As shown in Table 6, the addition of the crosslinking monomer significantly increases the hardness and Tg of Samples 3 and 4 in comparison to Sample 2. Hardness increased from a Barcol of 83.0 (Sample 2) to 85.5 with the addition of 9.9 wt % SR368 (Sample 4), and to 87.5 with 19.8 wt % SR368 (Sample 3). The glass transition temperature (Tg) similarly increased from 95° C. (Sample 2) to 106° C. with 9.9 wt % SR368 (Sample 4), and to 113° C. with 19.8 wt % SR368 (Sample 3). However, the addition of increasing amounts of SR368 adversely affected both the faded transmission state—from 86.8% (Sample 2) to 86.1% for Sample 4, and to 84.8% for Sample 3. The photochromic time to fade was also adversely affected with increasing amounts of crosslinking monomer—from 26.6 minutes (Sample 2) to 36.7 minutes for Sample 4, and to 46.2 minutes for Sample 3.

Polyurethane composition Sample 5 demonstrates the use a high crosslinking nano-hybrid material to increase hardness of the lens—in this case, MA0735, an eight-functional methacrylated polyhedral oligomeric silsesquioxanes (POSS). The presence of MA0735 at a concentration of 9.9 wt % resulted in an increase in hardness from Barcol 83.0 (Sample 2) to 86.5 (Sample 5). The glass transition temperature (Tg) similarly increased from 95° C. for Sample 2 to 97° C. for Sample 5. However, in contrast to the use of the crosslinking monomer SR368, the use of MA0735 did not adversely affect the photochromic properties of the lens. In fact, the photochromic properties are improved by using the POSS compound in that the faded transmission of the lens increased from 86.6% for Sample 2 to 87.4% for Sample 5, and the time to fade decreased from 26.6 minutes for Sample 2 to 24.9 minutes for Sample 5. These improved properties contrast to the addition of an equivalent weight percentage of SR368 crosslinking monomer shown in Sample 4.

Polyurethane composition Sample 6 demonstrates how the approaches of Samples 4 and 5 can be combined to produce a harder lens than Sample 2. In this case, about 6 wt % of the MA0735 is combined with about 2 wt % SR368 to produce a lens with a Barcol hardness of 86.0. However, the photochromic properties are somewhat compromised, as one would expect with an intermediate composition between that of Sample 4 and Sample 5.

Polyurethane composition Sample 7 demonstrates the use of a photochromic promoter as described above. In this case, the promoter is the tertiary amine, 4-[2-(dimethylamino) ethyl]morpholine (DMAEM). This compound exhibits excellent solubility for the photochromic compounds and additives, and so is incorporated with them when producing the final composition. When incorporated into a composition comparable to that used in Sample 6, a significant improvement in Time To Fade results—from 28.5 minutes for Sample 6 to 13.6 minutes for Sample 7. The other desired properties of excellent hardness, low yellow index, faded/darkened transmission, impact strength and heat distortion temperature were maintained.

Although the invention has been described in detail with reference to preferred embodiments, variations and modifications exist within the scope and spirit of the invention as described and defined in the following claims.

What is claimed is:

1. A photochromic ophthalmic spectacle lens formed from a hard and rigid polymerization product having a composition comprising:
    a photochromic compound; and
    a copolymer comprising a polyhedral oligomeric silsesquioxane having a pendant group R containing from 1 to 20 carbon atoms and a polyurethane prepolymer that is the reaction product of an isocyanate and a compound having an active hydrogen containing group;
    wherein the polyhedral oligomeric silsesquioxane is present in a concentration of about 0.1 wt % to about 40 wt % of the composition.

2. The spectacle lens of claim 1, wherein the polyhedral oligomeric silsesquioxane has a formula selected from the group consisting of: $[(RSiO_{1.5})n]\Sigma n(Tn)$, $[R_{n+2}Si_{n-1}O_{1.5n-3}]\Sigma n(T_{n-1})$ and combinations thereof, where n is an even number and R is all the same or different organic groups.

3. The spectacle lens of claim 2, wherein the polyhedral oligomeric silsesquioxane has a structure selected from the group consisting of:

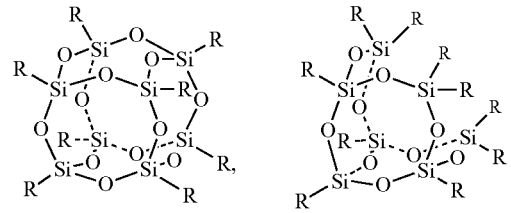

and mixtures thereof.

4. The spectacle lens of claim 1, wherein the polyhedral oligomeric silsesquioxane is present in a concentration of about 0.5 wt % to about 25 wt % of the composition.

5. The spectacle lens of claim 1, wherein the mole ratio of active hydrogen containing groups in the compound having an active hydrogen containing group to the isocyanate groups in the isocyanate is about 0.6 or less.

6. The spectacle lens of claim 1, wherein the mole ratio of active hydrogen containing groups in the compound having an active hydrogen containing group to the isocyanate groups in the isocyanate is in the range of about 0.02 to about 0.4.

7. The spectacle lens of claim 1, wherein the composition further comprises a monomer that has both an active hydrogen containing group and an unsaturated group, and having the formula

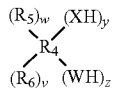

where y+z is greater than or equal to 1, X is O, S, NH, $NR_3$ or COO, W is O, S, NH, $NR_3$ or COO, w+v is greater than or equal to 1, $R_3$ is selected from the group consisting of alkylene, arylene, hydrocarbon and substituted hydrocarbon, $R_5$ and $R_6$ are the same or different unsaturated groups, and $R_4$ is selected from the group consisting of alkylene, arylene, polyester, polyether, hydrocarbon and substituted hydrocarbon having from 2 to 200 carbon atoms.

8. The spectacle lens of claim 7, wherein the mole ratio of active hydrogen containing groups in the monomer to the isocyanate groups in the isocyanate is in the range of about 0.5 to about 1.10.

9. The spectacle lens of claim 7, wherein the mole ratio of active hydrogen containing groups in the monomer to the isocyanate groups in the isocyanate is in the range of about 0.7 to about 0.9.

10. The spectacle lens of claim 7, wherein the mole ratio of active hydrogen containing groups in the compound having an active hydrogen containing group to the isocyanate groups in the isocyanate is about 0.6 or less.

11. The spectacle lens of claim 7, wherein the mole ratio of active hydrogen containing groups in the compound having an active hydrogen containing group to the isocyanate groups in the isocyanate is in the range of about 0.02 to about 0.4.

12. The spectacle lens of claim 1, wherein the photochromic compound is an organic photochromic dye.

13. The spectacle lens of claim 1, wherein the composition further comprises a photochromic promoter.

14. The spectacle lens of claim 13, wherein the photochromic promoter is present in a concentration of from about 0.01 wt % to about 5 wt %.

15. The spectacle lens of claim 13, wherein the photochromic promoter is present in a concentration of from about 0.1 wt % to about 2 wt %.

16. The spectacle lens of claim 1, wherein the composition further comprises one or more additives selected from the group consisting of: a non-photochromic dye or pigment, an anti-oxidant, an inhibitor, a photoinitiator, a thermal polymerization initiator and a photostabilizer.

17. The spectacle lens of claim 16, wherein the additives are present in a concentration of about 0.001 wt % to about 2.0 wt %.

18. A composition for a hard and rigid, photochromic optical article, comprising:
  a photochromic compound; and
  a copolymer comprising:
    a polyurethane prepolymer comprising the reaction product of:
    an aromatic, aliphatic or cycloaliphatic isocyanate having the formula $R_1(NCY)_x$, where x is greater than or equal to 2, Y is O or S, and $R_1$ is selected from the group consisting of: alkylene, arylene, hydrocarbon and substituted hydrocarbon containing one or more aryl-NCY and/or one or more alkyl-NCY bonds; and
    a compound having an active hydrogen containing group having the formula $(XH)_y R_2(WH)_z$, where y+z is greater than or equal to 2, X is O, S, NH, $NR_3$ or COO, W is O, S, NH, $NR_3$ or COO, $R_3$ is selected from the group consisting of alkylene, arylene, hydrocarbon and substituted hydrocarbon, and $R_2$ is selected from the group consisting of alkylene, arylene polyester, polyether, hydrocarbon and substituted hydrocarbon having 2 to 200 carbon atoms;
  a polyhedral oligomeric silsesquioxane having a pendant group R containing from 1 to 20 carbon atoms; and
  a monomer having the formula

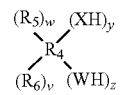

where y+z is greater than or equal to 1, X is O, S, NH, $NR_3$ or COO, W is O, S, NH, $NR_3$ or COO, w+v is greater than or equal to 1, $R_5$ and $R_6$ are the same or different unsaturated groups, and $R_4$ is selected from the group consisting of alkylene, arylene, polyester, polyether, hydrocarbon and substituted hydrocarbon having from 2 to 200 carbon atoms;
  wherein the polyhedral oligomeric silsesquioxane is present in a concentration of about 0.1 wt % to about 40 wt % of the composition.

19. The photochromic composition of claim 18, wherein the isocyanate is selected from the group consisting of: m (or p)-xylene diisocyanates, isophorone diisocyanate, trimethylhexamethylene diisocyanate, dicyclohexylmethylene diisocyanate, hexamethylene diisocyanate, cyclohexane diisocyanate, bis(isocyanatomethyl)cyclohexane, toluene diisocyanate, methylene diphenyldiisocyanate, polymeric methylene diphenyl diisocyanate, phenylene diisocyanate, naphthalene diisocyanate and derivatives thereof.

20. The photochromic composition of claim 18 wherein the compound having an active hydrogen containing group is selected from the group consisting of: di-, tri- or tetra-functional polycaprolactones, polyethylene glycol, polypropylene glycol, ethoxylated or propoxylated trimethylolpropane, hexanediol, butanediol, di-, tri- or tetra-functional mercaptoproprionates, ethanedithiol, cyclohexanedithiol, diethyltoluenediamine, hydroxylethylamine and 2-mercaptoethanol.

21. The photochromic composition of claim 18, wherein the polyhedral oligomeric silsesquioxane has a formula selected from the group consisting of: $[(RSiO_{1.5})n]\Sigma n(Tn)$, $[R_{n+2}Si_{n-1}O_{1.5n-3}]\Sigma n(T_{n-11})$ and mixtures thereof, where n is an even number and R is all the same or different organic groups.

22. The photochromic composition of claim 21, wherein the polyhedral oligomeric silsesquioxane has a structure selected from the group consisting of:

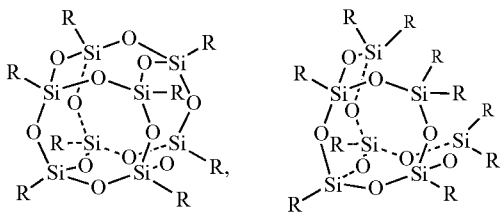

and mixtures thereof.

23. The photochromic composition of claim 21, wherein R has an active hydrogen containing group.

24. The photochromic composition of claim 21, wherein R has an unsaturated group.

25. The photochromic composition of claim 24, wherein R is selected from the group consisting of: methacryl, methacrylphenyl, methacrylisooctyl, methacrylisobutyl, acrylo, acryloisobutyl, allylisobutyl, monovinylisobutyl, octavinyl and octavinyldimethylsilyl groups.

26. The photochromic composition of claim 18, wherein the monomer is a hydroxylalkyl (meth)acrylate selected from the group consisting of: hydroxyethyl (meth)acrylate, hydroxybutyl (meth)acrylate and pentaerythritol tri(meth) acrylate.

27. The photochromic composition of claim 18, wherein the photochromic compound is an organic photochromic dye selected from the group consisting of: spiropyran, spirooxazine, naphthopyran, benzopyran, fulgicide and indenonphthopyran.

28. The photochromic composition of claim 18, further comprising a photochromic promoter.

29. The photochromic composition of claim 28, wherein the photochromic promoter is selected from the group consisting of: a tertiary amine, an amide, a sulfone and derivatives and analogs thereof.

30. The photochromic composition of claim 28, wherein the photochromic promoter is 4-[2-(dimethylamino)ethyl] morpholine.

31. A method of making a hard and rigid, photochromic optical article, comprising the steps of:
providing an isocyanate, a compound having an active hydrogen containing group, a monomer that has both an active hydrogen containing group and an unsaturated group, a polyhedral oligomeric silsesquioxane and a photochromic compound;
combining the photochromic compound with the isocyanate or the compound having an active hydrogen containing group or the monomer that has both an active hydrogen containing group and an unsaturated group;
combining the isocyanate and the compound having an active hydrogen containing group to form a polyurethane prepolymer;
combining the monomer with the polyurethane prepolymer to form a urethane resin; and
combining the polyhedral oligomeric silsesquioxane with the urethane resin to form a photochromic composition, wherein the polyhedral oligomeric silsesquioxane is present in a concentration of about 0.1 wt % to about 40 wt % of the composition, and
polymerizing the photochromic composition to form the article.

32. A photochromic ophthalmic spectacle lens made according to the method of claim 31.

33. A method of making a hard and rigid, photochromic optical article, comprising the steps of:
providing an isocyanate, a compound having an active hydrogen containing group, a monomer that has both an active hydrogen containing group and an unsaturated group, a polyhedral oligomeric silsesquioxane, a photochromic compound and a photochromic promoter;
combining the isocyanate and the compound having an active hydrogen containing group to form a polyurethane prepolymer;
combining the monomer with the polyurethane prepolymer to form a urethane resin;
combining the photochromic compound with the photochromic promoter;
combining the photochromic compound, the photochromic promoter and the polyhedral oligomeric silsesquioxane with the urethane resin to form a photochromic composition, wherein the polyhedral oligomeric silsesquioxane is present in a concentration of about 0.1 wt % to about 40 wt % of the composition, and polymerizing the mixture the photochromic composition to form the article.

34. A photochromic ophthalmic spectacle lens made according to the method of claim 33.

35. The photochromic ophthalmic spectacle lens of claim 1, wherein the polyhedral oligomeric silsesquioxane has an active hydrogen group that is capable of reacting with the isocyanate.

36. The photochromic ophthalmic spectacle lens of claim 1, wherein the polyhedral oligomeric silsesquioxane has an unsaturated functional group.

37. The photochromic ophthalmic spectacle lens of claim 36, wherein the copolymer further comprises a monomer having both an active hydrogen group and an unsaturated functional group.

38. The photochromic ophthalmic spectacle lens of claim 1, wherein the composition further comprises a monomer that is a solvent for the photochromic compound.

39. The photochromic optical article of claim 18, further comprising a monomer that is a solvent for the photochromic compound.

40. A photochromic ophthalmic lens formed from a hard and rigid polymer having a composition comprising:
a photochromic compound;
a polyhedral oligomeric silsesquioxane having a plurality of pendant groups R containing 1-20 carbon atoms and having unsaturated functionality;
a polyurethane prepolymer that is the reaction product of an isocyanate compound and a compound having an active hydrogen containing group, the polyurethane prepolymer having a terminal unreacted isocyanate group; and
a monomer having both an active hydrogen group and unsaturated functionality;
wherein the polyhedral oligomeric silsesquioxane is present in a concentration of about 0.1 wt % to about 40 wt % of the composition, and wherein the composition is cured by free radical polymerization to form a polyhedral oligomeric silsesquioxane cross-linked polymer.

41. The photochromic ophthalmic lens of claim 40, wherein the polyhedral oligomeric silsesquioxane has a formula selected from the group consisting of: $[(RSiO_{1.5})n]\Sigma n(Tn)$, $[R_{n+2}Si_{n-1}O_{1.5-3}]\Sigma n(T_{n-1})$ and mixtures thereof, where n is an even number and R is all the same or different and has unsaturated functionality.

42. The photochromic ophthalmic lens of claim 41, wherein R is all the same and is a (meth)acrylate.

43. The photochromic ophthalmic lens of claim 40, wherein the composition further comprises a photochromic promoter.

44. The photochromic ophthalmic lens of claim 43, wherein the photochromic promoter is selected from the group consisting of: a tertiary amine, an amide, a sulfone, and combinations thereof.

45. The photochromic ophthalmic lens of claim 43, wherein the photochromic promoter is selected from the group consisting of: bis-(2-dimethylaminoethyl)ether, 2-2'-dimorpholinodiethylether, 4-[2-(dimethylamino)ethyl]morpholine, vinyl pyrrolidone, vinyl sulfone, and combinations thereof.

* * * * *